United States Patent
Chomik

[19]

[11] Patent Number: 6,142,325
[45] Date of Patent: Nov. 7, 2000

[54] CONTAINER ASSEMBLY AND BOTTOM CAP THEREFOR

[75] Inventor: Richard S. Chomik, Garwood, N.J.

[73] Assignee: Playtex Products, Inc., Westport, Conn.

[21] Appl. No.: 09/175,086

[22] Filed: Oct. 19, 1998

[51] Int. Cl.$^7$ ............................................. B65D 53/00
[52] U.S. Cl. .................... 215/343; 215/341; 215/370; 220/304; 220/378; 220/614; 220/916
[58] Field of Search ............................. 215/2, 329, 341, 215/343, 370; 220/304, 378, 614, 625, 635, 916

[56] References Cited

U.S. PATENT DOCUMENTS

| | | |
|---|---|---|
| 831,133 | 9/1906 | Anderson . |
| 921,387 | 5/1909 | Etter . |
| 1,660,606 | 2/1928 | Evans ........................................ 215/2 X |
| 2,084,099 | 6/1937 | Maccoy . |
| 2,112,685 | 3/1938 | Armspach . |
| 2,372,281 | 3/1945 | Jordan . |
| 2,774,500 | 12/1956 | Budiani . |
| 2,982,432 | 5/1961 | Mehl . |
| 3,071,281 | 1/1963 | Sawai .................................. 220/916 X |
| 3,124,264 | 3/1964 | Waisberg ............................... 215/2 X |
| 3,134,495 | 5/1964 | Carbonel . |
| 3,768,682 | 10/1973 | Meyers et al. . |
| 3,883,025 | 5/1975 | Jemmett . |
| 4,010,861 | 3/1977 | Welten . |
| 4,036,388 | 7/1977 | Davidson . |
| 4,331,249 | 5/1982 | Banich, Sr. ........................... 215/343 |
| 4,401,224 | 8/1983 | Alonso . |
| 4,545,491 | 10/1985 | Bisgaard et al. . |
| 4,685,577 | 8/1987 | Chen et al. . |
| 4,723,668 | 2/1988 | Cheng . |
| 4,828,126 | 5/1989 | Vincinguerra . |
| 4,865,207 | 9/1989 | Joyner et al. . |
| 4,928,836 | 5/1990 | Wu et al. . |
| 5,071,017 | 12/1991 | Stull . |
| 5,215,312 | 6/1993 | Knappe et al. . |
| 5,339,971 | 8/1994 | Röhrig . |
| 5,431,290 | 7/1995 | Vinciguerra . |
| 5,433,353 | 7/1995 | Flinn . |
| 5,499,729 | 3/1996 | Greenwood et al. . |
| 5,601,199 | 2/1997 | Marty . |
| 5,607,074 | 3/1997 | De Gennaro . |
| 5,662,684 | 9/1997 | Caso ........................................ 215/2 X |
| 5,769,255 | 6/1998 | Ohmi et al. ........................ 215/343 X |
| 5,868,273 | 2/1999 | Daenen et al. ......................... 220/795 |

FOREIGN PATENT DOCUMENTS

| | | |
|---|---|---|
| 1 058 610 | 11/1953 | France . |
| 2 238 729 | 6/1991 | United Kingdom . |
| WO 90/07320 | 7/1990 | WIPO . |

*Primary Examiner*—Stephen K. Cronin
*Attorney, Agent, or Firm*—Ohlandt, Greeley, Ruggiero & Perle, L.L.P.

[57] ABSTRACT

There is provided a container having a container with open end, and a bottom cap has a sealant material bonded thereto to provide a hermetic seal between the bottom cap and the open bottom of the container and a grip surface through or slightly beyond the exterior surface of the bottom cap to contact a substrate, such as a table.

23 Claims, 4 Drawing Sheets

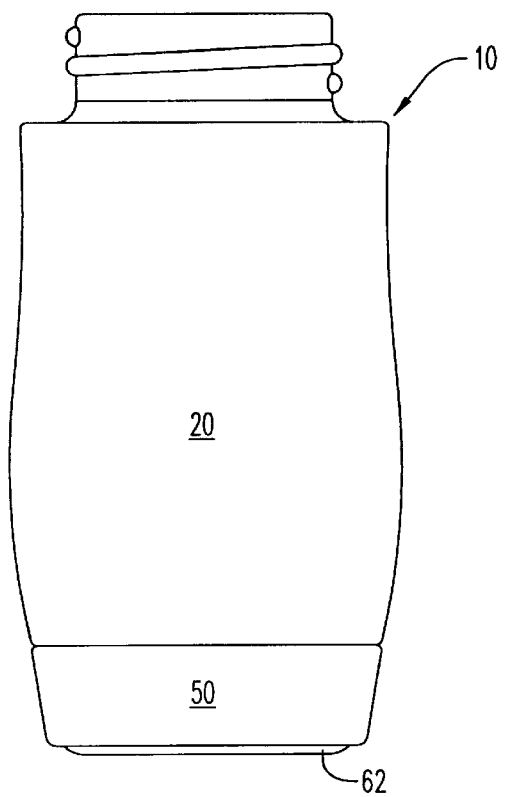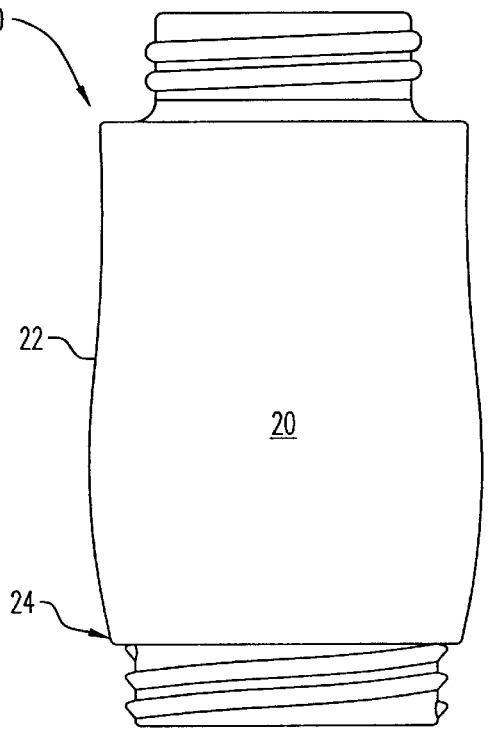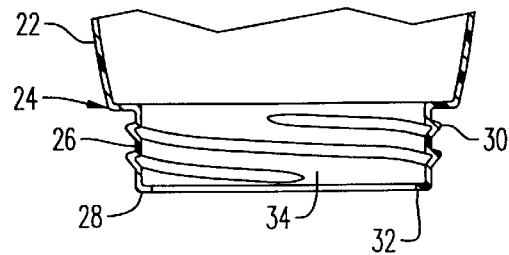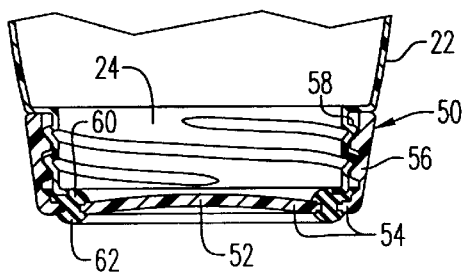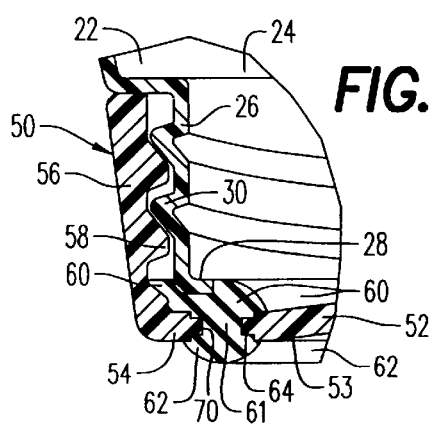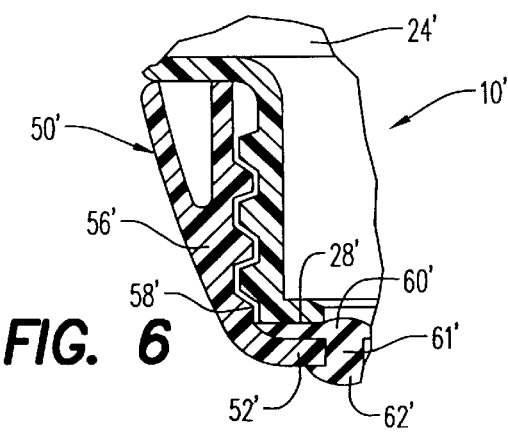

FIG. 14

| FORMING A BOTTOM CAP BY INJECTING INTO A MOLD, MATERIAL TO FORM A BOTTOM CAP HAVING A BOTTOM WALL WITH A PERIPHERAL PORTION | → | INJECTING AN ANNULAR LAYER OF SEALANT MATERIAL ONTO AND BONDING IT TO THE PERIPHERAL PORTION OF THE BOTTOM WALL |

CONTAINER ASSEMBLY AND BOTTOM CAP THEREFOR

BACKGROUND OF THE INVENTION

1. Field of the Invention

The present invention relates to a container having an open bottom, and a bottom cap for closing and hermetically sealing the open bottom. More particularly, the present invention is directed to such a container and bottom cap in which the bottom cap has a sealant material bonded thereto for forming the hermetic seal.

Containers having integral bottoms or bottom walls are well known. However, such containers can be problematic, especially elongated and/or narrow diameter containers whose remote portions are difficult to reach and effectively clean. In an effort to alleviate this problem, such containers, for example bottles and cups for feeding babies, have been formed as a container assembly having a body with an open bottom, and a removable bottom cap, to allow easy access to and separate and thorough cleaning of each component. These container assemblies require a hermetic seal between the open bottom of the container and the bottom cap. The hermetic seal has been obtained by employing a sealing structure, such as an annular ring seal, that is separate and removable from the other assembly components. However, employing a separate sealing structure renders the container assembly more complicated to assemble and, thus, use. If it is not removed and cleaned, there is the possibility that undesirable matter, e.g. liquid, food, and the like will accumulate or form between the separate sealing structure and its underlying surface.

It is desired to have a sealing system for a container assembly with a removable bottom cap that overcomes the aforementioned shortcomings.

SUMMARY OF THE INVENTION

It is an object of the present invention to provide a hermetic sealing system for a container assembly having a container with a removable bottom cap.

It is another object of the present invention to provide such a sealing system in which the sealant is bonded to the bottom cap of the container assembly.

It is yet another object of the present invention to provide such a container assembly in which the sealant in the bottom cap provides the hermetic seal between the bottom cap and the container.

It is a further object of the present invention to provide an alternative sealant that is secured to the container to provide a hermetic seal between the bottom cap and the container.

It is still another object of the present invention to provide such a container assembly in which the bottom cap has a sealant material bonded thereto for providing a hermetic seal between the bottom cap and the open bottom of the container and, simultaneously provides a grip surface through or slightly beyond the exterior surface of the bottom cap to contact a substrate, such as a table.

The present invention includes a bottom cap for closing and hermetically sealing the open bottom end of a container. The bottom cap includes a bottom wall having a peripheral portion, a side wall extending upwardly from the peripheral portion and means for securing the bottom cap to the open bottom end of the container. The peripheral portion includes a peripheral continuous, preferably annular, layer of sealant material bonded thereto that is adapted to hermetically seal the bottom end of the container when the bottom cap is secured thereto.

The present invention also includes a container assembly comprised of a container having an open bottom end with a downwardly directed sealing surface, means for securing a bottom cap to the open bottom end, a bottom cap, and a continuous, preferably annular, layer or strip of compressible sealant material bonded to the container assembly. The strip is adapted so that when the bottom cap is secured to the open bottom end, the strip is between the sealing surface and the bottom wall, and the sealing surface compresses the strip against the bottom wall thereby forming a hermetic seal between the container and the bottom cap. In the container assembly, the strip is preferably bonded to the interior surface of the bottom wall of the bottom cap.

Also preferably, the peripheral portion of the bottom cap has holes therethrough and the sealant material extends into and slightly through the holes. The sealant material that extends into the holes preferably extends below the bottom surface of the bottom wall of each hole, where it can be in the form of an individual bead below each hole. Each bead preferably has a peripheral edge that underlies and is bonded to the bottom surface of the bottom wall. Also preferably, the peripheral portion has an annular series of circumferentially spaced holes therethrough, and the sealant material of the strip extends through and below the holes, and is in the form of a continuous, preferably annular, layer that is fused to the bottom surface of the peripheral portion.

The present invention also includes a method of forming the bottom cap of the present invention. The method includes forming the bottom cap of a first material, and injecting a sealant material onto the peripheral portion of the bottom cap so that the sealant material forms an annular layer on the peripheral portion. The injection step is effected at a temperature and under conditions sufficient to fuse the layer of sealant material to the peripheral portion. The forming step preferably includes forming an annular series of circumferentially spaced holes through the peripheral portion of the bottom wall, and the injecting step preferably includes flowing the sealant material through and below the holes so that the sealant material below the holes forms either a series of beads or an underlying annular layer that is fused to the bottom surface of the bottom wall. Preferably, the underlying layer is formed so that it has outer edges that underlie the bottom wall adjacent the holes. In the method, the bottom cap is preferably polypropylene, and the sealant material is preferably a thermoplastic elastomer having a Shore A Hardness from about 40 to about 50.

BRIEF DESCRIPTION OF THE DRAWINGS

FIG. 1 is a front elevational view of a container assembly of the present invention;

FIG. 2 is a front elevational view of the container body of the container assembly of FIG. 1;

FIG. 3 is a vertical section, with portions broken away, of the open bottom end of the container body of FIG. 2;

FIG. 4 is a vertical sectional view, with portions broken away, of the bottom end of the container assembly of FIG. 1;

FIG. 5 is an enlarged vertical sectional view, with portions broken away, of the lower left portion of the container assembly of FIG. 4;

FIG. 6 is an enlarged vertical sectional view, with portions broken away, of an alternate embodiment of the container assembly of the present invention;

FIG. 14 is a flow chart showing method steps of the present invention.

DETAILED DESCRIPTION OF THE PREFERRED EMBODIMENTS

Figure 7:
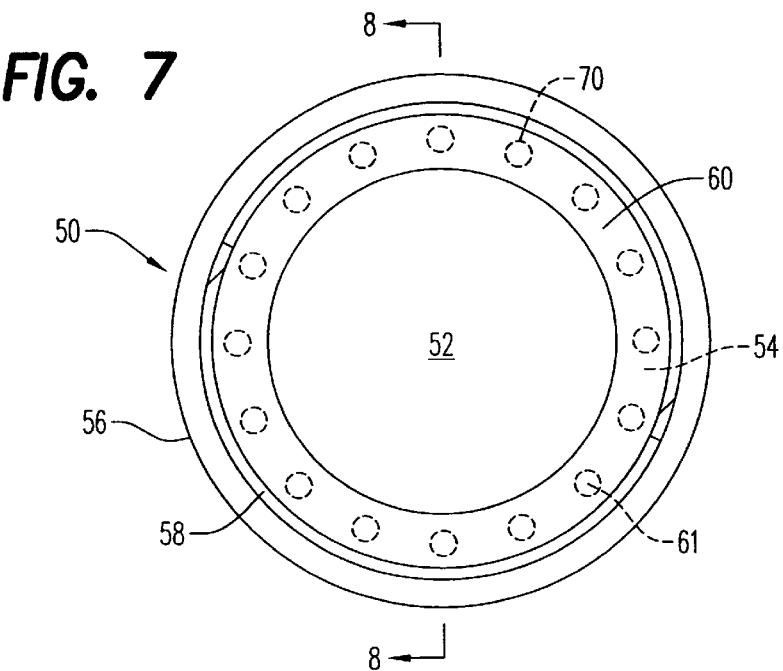
FIG. 7 is a top plan view of the bottom cap of FIG. 6.

Referring to the drawings and, in particular, to FIG. 1, there is shown a preferred container assembly of the present invention, generally represented by the reference number 10. The container assembly 10 includes a container 20, and a bottom cap 50 removably secured to the container.

As shown in FIGS. 2 and 3, container 20 has a body 22 having an open bottom end or portion 24. The bottom end 24 preferably has a cylindrical neck 26, a downwardly directed sealing surface 28, and structure, such as, for example, an external thread 30, for securing bottom cap 50 to container body 22 and, thus, container 20. The sealing surface 28 has a rim 32 that defines a bottom opening 34. Preferably, bottom opening 34 is a wide mouth opening. The sealing surface 28 has an inside surface 28-1 extending from rim 32 into bottom opening 34 and an outside surface 28-2 defined on cylindrical neck 26.

Figure 8:
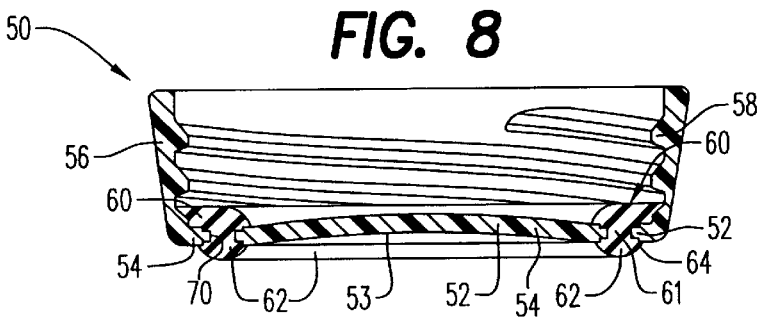
FIG. 8 is an enlarged vertical sectional view of the preferred bottom cap of FIG. 6, as seen along line 8—8 of FIG. 7.

FIGS. 4 and 5 show bottom cap 50 closing and hermetically sealing bottom end 24 of container body 22. The bottom cap 50, also shown in FIG. 8, is a preferred embodiment of the bottom cap of the present invention. The bottom cap 50 has a bottom wall 52 with a bottom surface 53 and a peripheral portion 54, and an upwardly extending side wall, here shown as cylindrical peripheral wall 56. The wall 56 has structure, such as, for example, an internal thread 58 that is adapted to be threadedly engage threads 30 to secure bottom cap 50 to neck 26 of container body 22. The bottom cap 50 also has a peripheral, continuous annular strip or layer of sealant material 60 bonded to peripheral portion 54 of bottom wall 52. As more clearly shown in FIG. 5, when bottom cap 50 is threadedly secured to bottom end 24 of container body 22, sealing surface 28 of neck 26 engages and compresses strip 60, thereby enveloping sealing surface 28, inside surface 28-1 and outside surface 28-2 with strip 60 forming a hermetic seal between sealing surface 28 and bottom wall 52.

Figure 8A:
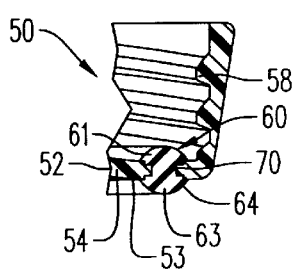
FIG. 8A is an enlarged vertical sectional view, with portions broken away, of a portion of a bottom cap having a bead on the bottom thereof.
Figure 9A:
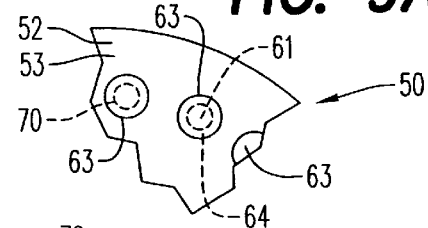
FIG. 9A is a bottom plan view, with portions broken away, of a bottom cap having beads on the bottom thereof.

Preferably, peripheral portion 54 of bottom wall 52 has an annular series of circumferentially spaced openings or holes 70 therethrough, and strip 60 extends into and through and preferably protrudes below holes 70 in bottom surface 53 of bottom wall 52. The sealant material of sealant material strip 60 in each hole 70 is referred to as a post 61. As shown in FIGS. 8A and 9A, the portion of the post 61 that protrudes below holes 70 can be in the form of an individual bead 63 below each hole. The bead 63 preferably has a peripheral edge 64 that underlies and preferably is bonded to bottom surface 53 adjacent each hole 70. The edges 64 of beads 63 are advantageous because they form at least a mechanical, and preferably a bonded, interlock between the underlying edges and the exterior of bottom surface 53 of bottom wall 52. This helps prevent or prevents strip 60 from being removed from bottom wall 52.

Alternatively, post 61 of strip 60 that extends through hole 70 communicates with an underlying continuous, preferably annular, strip or layer of the sealant material 62 below and preferably bonded to bottom surface 53 of bottom wall 52. The underlying layer 62, like each bead 63, also preferably has side edges 64 that underlie and preferably are bonded to bottom surface 53 of bottom wall 52 adjacent holes 70.

Figure 9:
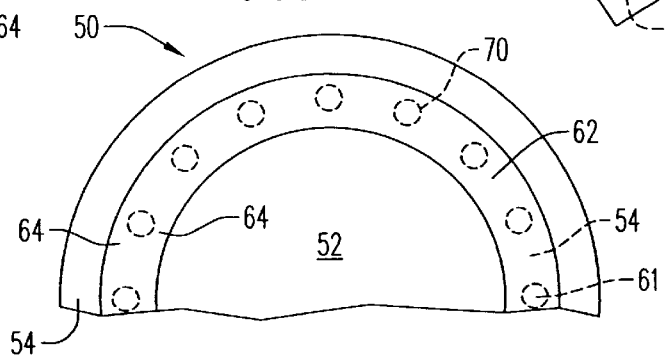
FIG. 9 is a bottom plan view, with portions broken away, of the bottom cap of FIG. 7.

As shown in FIG. 9, a plurality of beads (not shown) in series may form a continuous or discontinuous layer or, more preferably, the underlying layer 62 of sealant material. The beads individually, discontinuous, continuously, or the underlying layer 62 of sealant material (shown in FIG. 9), are advantageous because they form a grip or non-slip, non-scratch surface on a support surface, such as a table top (not shown). Also, FIG. 9 shows that continuous underlying layer 62 has side edges 64 that underlie and preferably are bonded to bottom surface 53 of bottom wall 52.

FIGS. 4, 5 and 8 show that strip 60 preferably is positioned such that a portion of it fills and is bonded to the junction of or a portion of the junction of bottom wall 52 and side wall 56 of bottom cap 50. The strip 60 preeferably is bonded to a portion of side wall 56. The junction of bottom wall 52 and side wall 56 can be any suitable shape. For example, it can have a step therein as shown in the preferred bottom cap 50 of FIGS. 5 and 8, it can be angular (not shown), or it can be curved, as shown in the alternative bottom cap 50' in FIGS. 6 and 10.

Figure 10:
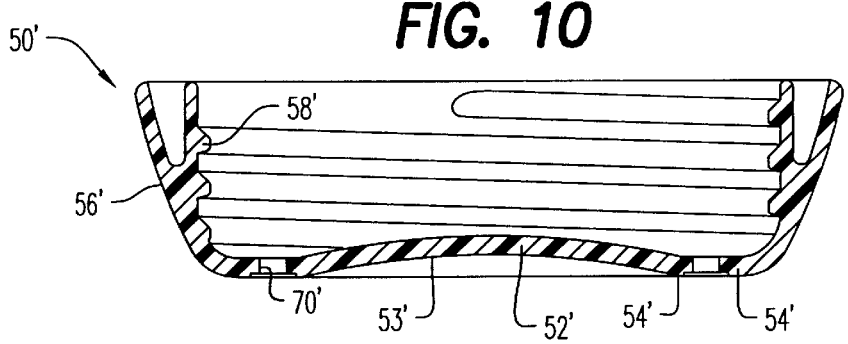
FIG. 10 is a vertical sectional view through alternate embodiment of the bottom cap of the present invention, shown without a sealant material.

FIG. 6 shows a bottom portion of an alternative embodiment of a container assembly 10' of the present invention cap, generally represented by the reference number 10'. Structure or elements that are similar to or the same as those shown in FIGS. 1 through 5 and 7 through 9 are identified by the same reference number with a prime. More particularly, FIG. 6 shows alternative bottom cap 50' (also shown in FIG. 10) secured to, closing and hermetically sealing the open bottom end 24' of container body 22'. FIGS. 6 and 10 show that the junction of bottom wall 52' and side wall 56' is curved, and the portion of annular strip or layer 60' above bottom wall 52' is wider and thinner than layer 60 of bottom cap 50 (FIGS. 4, 5 and 8). FIGS. 6 and 10 also show that sealing surface 28' of neck 26' of bottom end 24' is wider than sealing surface 28 of FIG. 5. The sealing surface 28' compresses a wider extent of layer 60' than sealing surface 28 compresses of layer 60 in FIG. 5.

FIG. 7 shows that layer 60, bonded to the upper surface of peripheral portion 54 of bottom wall 52, is annular and continuous and has side edges that overlie and are bonded to the upper surface of the peripheral portion. FIG. 7 also shows the annular series of circumferentially spaced holes 70 and posts 61 therein.

FIG. 8 shows a preferred vertical cross-sectional profile of layer 60, post 61 and layer 62 of bottom cap 50 when layer 60 is not compressed by a sealing surface of an open bottom end of the container.

FIG. 10 shows the alternative bottom cap 50' of the present invention that was discussed above in connection with FIG. 6. FIG. 10 shows that the central portion of bottom wall 52' of bottom cap 50' is preferably concave when viewed from the bottom, most or all of peripheral portion 54', especially its outer peripheral portion, is substantially planar and substantially horizontal, and peripheral portion 54' communicates with side wall 56' through a junction that is concavely arcuate when viewed from the inside of bottom cap 50'. The concave shape of the central portion of bottom wall 52' adds strength to the bottom wall. The substantially planar and horizontal disposition of peripheral portion 54' and the shape of the junction and proximity of side wall 56' to peripheral portion 54' assist in locating and forming annular continuous peripheral layer 60' of sealant material on peripheral portion 54'.

Figure 12:
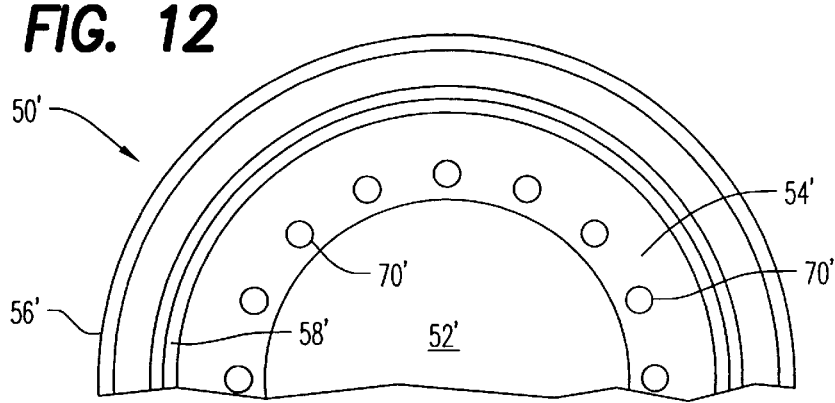
FIG. 12 is a top plan view, with portions broken away, of the bottom cap of FIG. 10.
Figure 11:
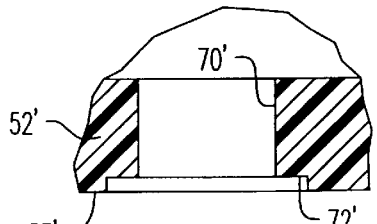
FIG. 11 is an enlarged sectional view of a lower right portion of the bottom cap of FIG. 10.
Figure 13:
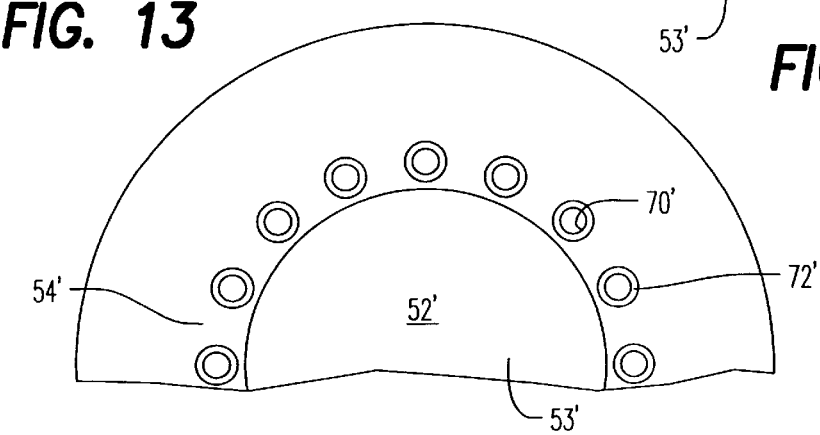
FIG. 13 is a bottom plan view, with portions broken away, of the bottom cap of FIG. 10.

FIG. 11 shows that each hole 70' preferably has an annular undercut 72' thereabout to facilitate formation of the hole. The undercut 72' also facilitates the flow of sealant material from hole 72' to underlying portions of bottom surface 53' adjacent holes 70' in bottom wall 52'. FIG. 12 shows annular series of holes 70' formed about peripheral portion 54' of bottom wall 52', and FIG. 13 shows an undercut 72' in bottom surface 53' about each hole 70' in bottom wall 52'.

According to the present invention, the hermetic seal effected between bottom end 24 and bottom caps 50, 50' can be effected in any suitable manner or location, provided the sealant material is bonded to preferably to bottom cap 24, or alternatively to the bottom of neck 26. When bottom cap 50, 50' is secured to bottom end 24, the sealant material will be disposed or located between and compressed to envelop sealing surface 28, 28', inside surface 28-1, 28-1' and outside surface 28-2, 28-2' to form a hermetic seal between a sealing surface 28, 28' of bottom end 24, 24', respectively, and an opposed sealing surface, e.g. bottom wall 52, 52' of bottom cap 50, 50', respectively. Thus, a sealant material in suitable form can be bonded to a portion of either bottom end 24 or bottom cap 50, 50'. Although not preferred, a strip, layer or other suitable form, e.g. an annular ring of sealant material, can be bonded to the sealing surface 28 of bottom end 24.

Container 20, 20' and bottom cap 50, 50' can be made of any suitable rigid or substantially rigid material that retains its shape, and can be sterilized, washed or cleaned, especially at elevated temperatures. Although glass or metal can be employed, rigid or substantially rigid plastics, polyesters, polyamides, polyolefins, polamides, polycarbonates, polyacrylates and polyurethanes and the like are preferred.

When container 20, 20' is for forming a container assembly for holding milk or another infant liquid product, the preferred material for forming container body 22, 22' is a polyolefin. The polyolefin is, for example, an ethylene or propylene polymer such as polypropylene, or, more preferably, a polycarbonate.

The bottom cap 50, 50' preferably is made of a polyolefin, for example, a propylene or ethylene polymer or copolymer, or combination of the same. Although ethylene polymers, such as high density polyethylene, can be employed, the preferred material for bottom cap 50, 50' is polypropylene.

The sealant materials for layer 60, 60' and the like suitable for use in the present invention are compressible during use such that when bottom cap 50 is secured, preferably threadedly secured, to open bottom end 24, 24', the sealing surface will compress layer 60, 60' to envelop sealing surface 28, 28', inside surface 28-1, 28-1' and outside surface 28-2, 28-2' to form a hermetic seal therewith.

The sealant material suitable for use in the present invention is compressible and must be bondable, preferably directly, to the material of the substrate or structure, e.g. to bottom cap 50 or container body 22 to which the sealant material is applied. Suitable sealant materials include silicones, urethanes and elastomers. The preferred elastomers are thermoplastic elastomers, sometimes referred to as "TPEs".

Suitable sealant materials for layer 60, 60' include those preferably having a Shore A Hardness from about 30 to about 60, more preferably from about 40 to about 50, and most preferably about 45. The hardness values described or recited herein are obtained by use of a durometer. Sealant materials having a Shore A Hardness progressively above about 60 and particularly approaching 100 would be expected to be too hard and inflexible to be compressed to envelop sealing surface 28, 28', inside surface 28-1, 28-1' and outside surface 28-2, 28-2' to form a hermetic seal, and materials having a Shore A Hardness progressively below about 30 would be expected to be progressively too soft and tacky to form durable practically operable hermetic seals.

According to the present invention, the bond of the sealant material to the surface or structure of, for example, bottom end 24 or bottom cap 50, can be effected in any suitable manner by any suitable means, so long as the bonded sealant material is integral or unitary with the surface or structure to which it is bonded. "Integral or unitary" means that the sealant material is one with or a unit with the surface or structure so that dirt, food, liquid or other matter cannot accumulate, form or otherwise get or be between the sealant material and the surface or structure. As will be more fully explained below, the preferred bond is obtained by fusion between the sealant material and the material of the substrate surface or structure. Though less preferred, bonding can be achieved by use of one or more adherents, blended with the sealant material and/or employed as one or more layers between the sealant material and the surface or structure. The adherent must be compatible with and must integrally or unitarily bond to, the sealant material and the surface or structure to, on or against which the sealant material and/or adherent is bonded. It is understood that the sealant material and any adherent must be suitable for the intended application for the container assembly or bottom cap. For example, for a container assembly and bottom cap that will be subjected to sterilization or washing at elevated temperatures, or cleaned with certain chemicals, the sealant material and the adherent(s) must maintain a sufficient bond under those conditions.

The present invention includes methods of forming bottom cap 50. The method includes forming bottom cap 50 of a first material by a molding process effected at an elevated temperature. As shown in FIG. 14, preferably the material for forming bottom cap 50 is injected into a mold shaped to form the desired bottom cap, with bottom having peripheral portion or wall 53, an upstanding threaded side wall 56, and, preferably an annular series of circumferentially spaced holes 70 through the bottom. Once formed, bottom cap 50 can be left in the mold if the injection system and mold assembly are adapted to inject and form layer 60, 60' on the bottom wall. Preferably, bottom cap 50 is removed to another mold where its elevated temperature is maintained, or the bottom cap is reheated to the desired elevated temperature. In the second mold, sealant material to form layer 60 is injected onto bottom cap 50, preferably onto the upper surface of its peripheral portion, to form layer 60 thereon. The sealant material is injected at a temperature and under conditions sufficient to bond, preferably fuse, the sealant material to the bottom wall. During injection of the sealant material, the temperature of the bottom wall is such that bottom cap 50 is rigid enough to maintain its body and shape, yet soft enough to bond to the sealant material. The bottom cap 50 with the sealant material thereon may need to be left in the mold at an elevated temperature sufficient to effect the bonding. When the bottom wall includes the annular series of spaced holes 70, the molds are adapted, and the injection of the sealant material includes flowing the material through and preferably below the holes, so that the sealant material below the holes has the desired shape and configuration and preferably is bonded to the bottom surface of the bottom wall. Preferably, the forming process is adapted so that any sealant material below the holes, whether in the form of beads or the preferred annular layer, has outer edges that underlie and are bonded to the bottom surface. Preferably, the first injected material to form bottom cap 50 is polypropylene and the second injected material to form the sealant layer is a thermoplastic elastomer having a Shore A Hardness of from about 40 to about 50.

The present invention having been thus described with particular reference to the preferred forms thereof, it will be obvious that various changes and modifications may be made therein whitout departing from the spirit and the scope of the present invention as defined in the appended claims.

What is claimed is:

1. A bottom cap for closing and hermetically sealing the open bottom end of a container, the bottom cap comprising:
   a bottom wall having a peripheral portion;
   a side wall extending upwardly from said peripheral portion, said side wall having means for securing said bottom cap to the bottom end of the container; and
   a continuous layer of sealant material bonded to said peripheral portion of said bottom wall, said sealant material being adapted to envelop the bottom end of the container forming a hermetic seal when said bottom cap is secured thereto.

2. The bottom cap of claim 1, wherein said sealant material has a Shore A Hardness from about 30 to about 60.

3. The bottom cap of claim 1, wherein said sealant material is a thermoplastic elastomer that has a Shore A Hardness from about 40 to about 50.

4. The bottom cap of claim 1, wherein said sealant material is a thermoplastic elastomer that has a Shore A Hardness about 45.

5. The bottom cap of claim 1, wherein said sealant material is fused to said peripheral portion.

6. The bottom cap of claim 1, wherein said peripheral portion has holes therethrough, and wherein said sealant material extends into said holes.

7. The bottom cap of claim 6, wherein said bottom wall has a bottom surface, and wherein said sealant material extending into said holes extends below said bottom surface of said bottom wall.

8. The bottom cap of claim 7, wherein said sealant material below said holes is in the form of an individual bead below each hole.

9. The bottom cap of claim 8, wherein said beads have peripheral edges that underlie said bottom surface of said bottom wall.

10. The bottom cap of claim 7, wherein said sealant material below said holes is in the form of an underlying continuous peripheral layer of said sealant material.

11. The bottom cap of claim 10, wherein said holes are positioned in an annular series and are circumferentially spaced from one another, and wherein said underlying continuous layer is bonded to said bottom surface of said peripheral portion.

12. A container assembly, comprising:
    a container having an open bottom end with a downwardly directed sealing surface having an inside surface and an outside surface, and means for securing a bottom cap to said bottom end;
    a bottom cap for closing and hermetically sealing said bottom end, said bottom cap having a bottom wall and an upstanding peripheral wall having means for securing said bottom cap to said-bottom end; and
    a continuous strip of compressible sealant material bonded to said container assembly, said strip being between said sealing surface and said bottom wall so that when said bottom cap is secured to said bottom end, said sealing surface compresses said strip against said bottom wall thereby enveloping said sealing surface, said inside surface and said outside surface forming a hermetic seal between said sealing surface of said container and said bottom cap.

13. The container assembly of claim 12, wherein said sealant material has a Shore A Hardness from about 30 to about 60.

14. The container assembly of claim 12, wherein said sealant material is a thermoplastic elastomer that has a Shore A Hardness about 45.

15. The container assembly of claim 12, wherein said strip is bonded to said sealing surface of said bottom end of said container.

16. The container assembly of claim 12, wherein said sealant material is a thermoplastic elastomer that has a Shore A Hardness from about 40 to about 50.

17. The container assembly of claim 16, wherein said thermoplastic elastomer of said strip is fused to said bottom wall of said bottom cap.

18. The container assembly of claim 12, wherein said strip is bonded to said bottom wall of said bottom cap.

19. The container assembly of claim 18, wherein said bottom wall has a bottom surface and a peripheral portion radially interior of said peripheral wall, said peripheral portion has an annular series of circumferentially spaced holes therethrough, and said sealant material of said strip extends through said holes, protrudes below said bottom surface, and has edges which underlie said bottom surface.

20. A container assembly, comprising
    a container having a threaded cylindrical bottom end with a downwardly directed sealing surface having an inside surface and an outside surface; and
    a bottom cap for closing and hermetically sealing a bottom end, said bottom cap having a bottom wall with a peripheral portion, and a threaded upstanding cylindrical peripheral wall for threadedly securing said bottom cap to said bottom end of said container, said peripheral portion of said bottom cap having an annular layer of compressible elastomeric sealant material fused thereto, said sealant material having a Shore A Hardness from about 30 to about 60, and said layer being adapted to be compressed by and thereby enveloping said sealing surface, said inside surface and said outside surface forming a hermetic seal with said sealing surface when said bottom cap is threadedly secured to said bottom end of said container.

21. The container assembly of claim 20, wherein said elastomeric material is a thermoplastic elastomer that has a Shore A Hardness about 45.

22. The container assembly of claim 20, wherein said peripheral portion of said bottom wall has an annular series of openings therethrough, and said elastomeric sealant material is a thermoplastic elastomer that extends through said openings, protrudes below, and underlies said bottom wall adjacent said openings.

23. The container assembly of claim 22, wherein said thermoplastic elastomer that underlies said bottom wall and is fused thereto.

* * * * *